United States Patent [19]

Owechko et al.

[11] Patent Number: 4,958,914

[45] Date of Patent: Sep. 25, 1990

[54] OPTICAL INTENSITY-TO-POSITION MAPPING AND LIGHT DEFLECTOR APPARATUS AND METHOD

[75] Inventors: Yuri Owechko, Newbury Park; Bernard H. Soffer, Pacific Palisades, both of Calif.

[73] Assignee: Hughes Aircraft Company, Los Angeles, Calif.

[21] Appl. No.: 198,018

[22] Filed: May 24, 1988

Related U.S. Application Data

[63] Continuation-in-part of Ser. No. 879,719, Jun. 27, 1986, abandoned, and a continuation-in-part of Ser. No. 900,053, Aug. 25, 1986, abandoned.

[51] Int. Cl.⁵ .................................................. G02F 1/13
[52] U.S. Cl. ................................. 350/342; 350/96.13; 350/96.14; 350/334; 350/347 V
[58] Field of Search ............... 350/347 V, 347 E, 342, 350/96.13, 96.14, 336, 334

[56] References Cited

U.S. PATENT DOCUMENTS

| | | | |
|---|---|---|---|
| 3,497,285 | 2/1970 | Eden | 350/356 |
| 3,820,875 | 6/1974 | Bohmer | 350/347 V |
| 4,190,330 | 2/1980 | Berreman | 350/331 R |
| 4,300,818 | 11/1981 | Schachar | 351/7 |
| 4,351,589 | 9/1982 | Chavel et al. | 350/342 |
| 4,373,218 | 2/1983 | Schachar | 3/13 |
| 4,408,836 | 10/1983 | Kikuno | 350/334 |
| 4,464,018 | 8/1984 | Gagnon | 350/342 X |
| 4,493,531 | 1/1985 | Bohmer et al. | 350/336 |
| 4,639,091 | 1/1987 | Huignard et al. | 350/348 X |
| 4,729,641 | 3/1988 | Mastsuoka et al. | 350/347 V X |
| 4,852,962 | 8/1989 | Nicia | 350/96.13 |

FOREIGN PATENT DOCUMENTS

0074144A1 8/1982 European Pat. Off. .
0121449A1 2/1984 European Pat. Off. .
2254057 11/1973 France .

OTHER PUBLICATIONS

Sato, S., "Liquid-Crystal Lens-Cells with Variable Focal Length," *Japanese J. Appl. Physics*, vol. 18, No. 9, pp. 1679–1684 (Sep. 1979).

Soffer, "Real-Time Implementation of Non Linear Optical Functions," *Annual Technical Report AFSC* Contract #F49620-81-C-0086 (Exhibit 3) pp. 1-39 (Dec. 1983).

(List continued on next page.)

*Primary Examiner*—Stanley D. Miller
*Assistant Examiner*—Anita Pellman Gross
*Attorney, Agent, or Firm*—V. D. Duraiswamy; W. K. Denson-Low

[57] ABSTRACT

A light deflector apparatus and method is disclosed which provides an optical intensity-to-position mapping as well as optical switching capabilities. An array of voltage gradient modules (24, 26, 28) are provided in a layer of electro-optic material (52), such as liquid crystals, by establishing variable spatial voltage gradients and accompanying electric fields in a direction transverse to input light (58). The voltage gradients are varied in accordance with the optical intensities at corresponding locations in the received light (58), resulting in optical outputs which vary in direction in accordance with the voltage gradient locations. The directional outputs are then focused to produce a positional mapping (64, 66, 68) of the input light intensities. The voltage gradients are preferably established by an interdigitated electrode array (50) and a counter electrode (54) on opposite sides of the liquid crystal (52). Reflective and transmissive light valve embodiments are described in which the voltage gradient modules form voltage dividers with an underlying photoconductive layer (56). A fiber optic switch is also described. Also described is a system in which the refractive indices of an array of small variable refraction modules are varied in accordance with the spatial optical intensities at corresponding locations in an input beam to produce as output, optical intensity-to-position mapping.

7 Claims, 9 Drawing Sheets

OTHER PUBLICATIONS

Soffer, "Real-Time Implementation of Non Linear Optical Processing Functions," *Final Technical Report AFSC* Contract #F49620-81-C-0086 (Exhibit 1) pp. 52-67 (Aug. 1984).

Ninomiya, Y., "Ultrahigh Resolving Electrooptic Prism Array Light Deflectors," *IEEE J. Quant. Electronics* vol. QE-9, No. 8 (Aug. 1973) pp. 791-795.

Herriau, et al., "Commutateur Optique Bidimensionnel Par Réseaux Holographiques Photoinduits," *J. Optics (Paris)*, (Sep.-Oct. 1984), vol. 15, No. 5, pp. 314-318.

Nikulin et al., "An Electrooptic Crystal Diffraction Deflector," *Radio Engineering & Electronic Physics*, vol. 19, No. 8 (1974) pp. 157-159.

Muriel et al., "Digital Light Beam Deflector with Liquid Crystals," *SPIE Conf. on Optical Systems & Applications*, (1980) vol. 236, pp. 386-388.

Ludeman et al., "Liquid Crystal Cell Having Nonuniform Thickness," *IBM Tech. Disc. Bull.*, vol. 15, No. 4 (Sep. 1972) pp. 1349-1350.

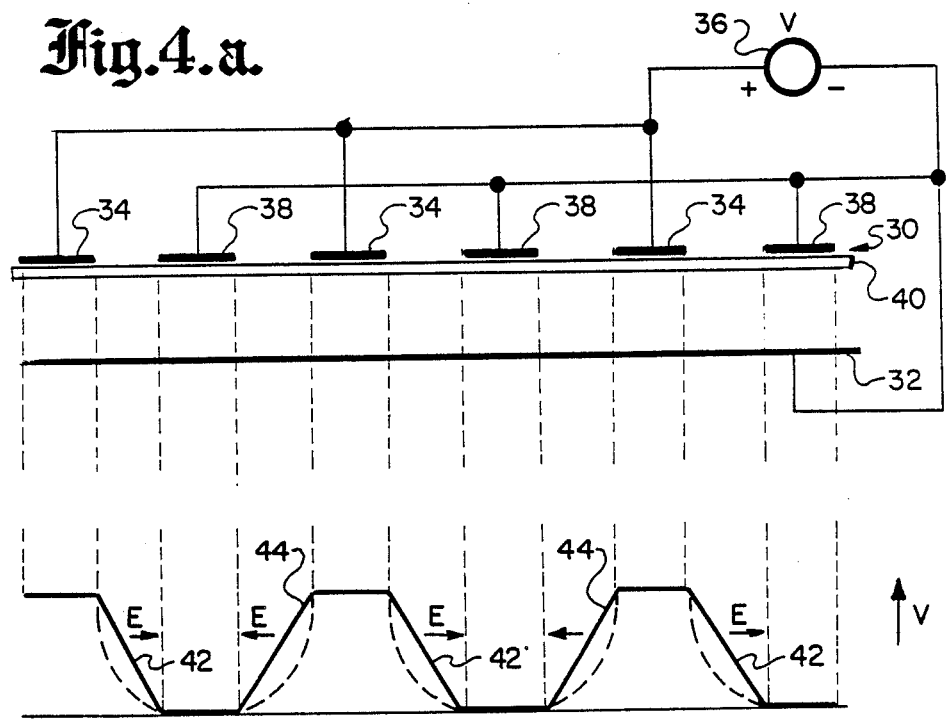
Fig.4.a.
Fig.4.b.
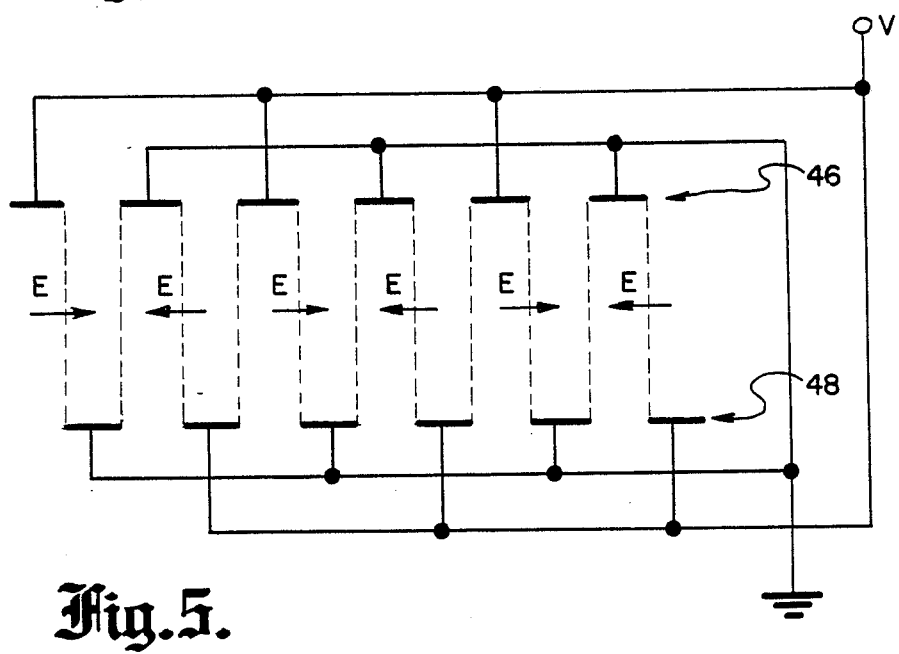
Fig.5.

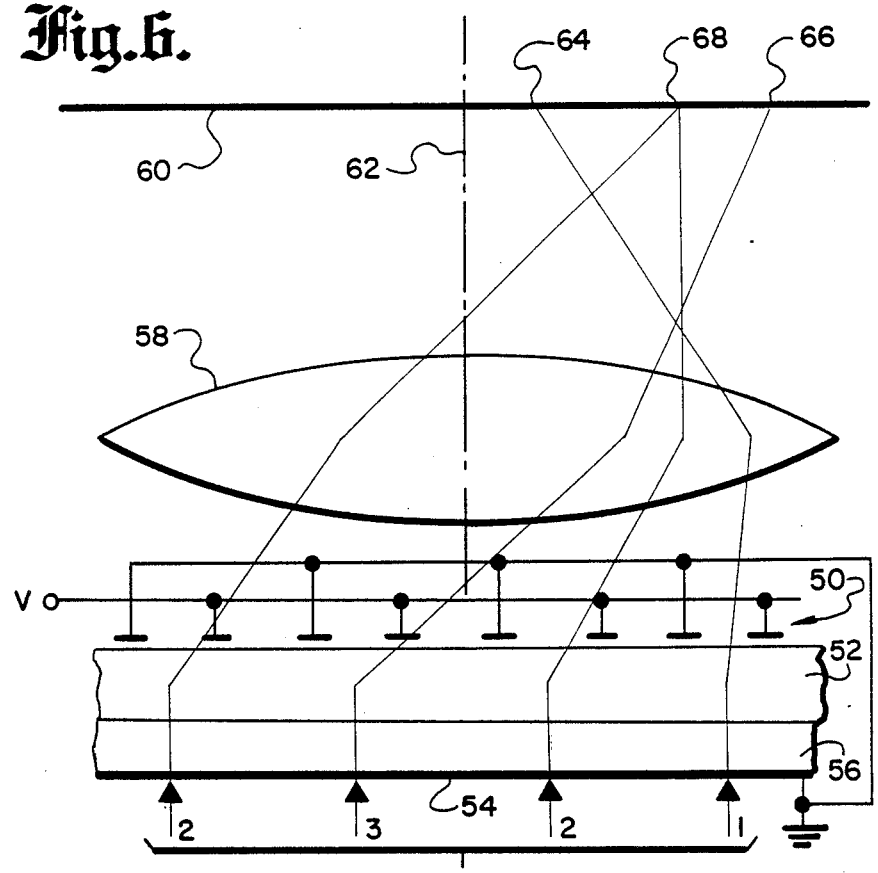
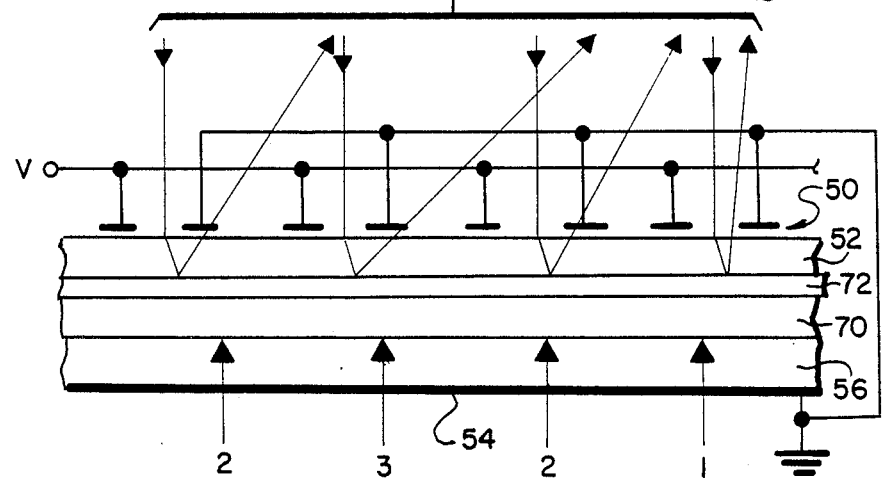

OPTICAL INTENSITY-TO-POSITION MAPPING AND LIGHT DEFLECTOR APPARATUS AND METHOD

This invention was made with Government support under Contract Nos. F-49620-77-C-0080 and F-49620-84-C-0096 awarded by the Department of the Air Force. The Government has certain rights in this invention.

CROSS-REFERENCES TO RELATED APPLICATIONS

This application is a continuation-in-part of copending applications Ser. No. 06/879,719, filed June 27, 1986 and Ser. No. 06/900,053, filed Aug. 25, 1986, both now abandoned and both copending applications assigned to Hughes Aircraft Company, the assignee of the present invention.

BACKGROUND OF THE INVENTION

1. Field of the Invention

This invention relates to the characterization and processing of optical beams, and more particularly to a system and method for converting the spatial intensity spectrum of a light beam to a positional mapping, or for deflecting light to achieve optical intensity-to-position mapping or to implement a switching mechanism.

2. Description of the Related Art

The distribution of optical intensities across a single light beam or a series of separate light beams may form the basis for optical computing and logic processing by first converting the distribution of light intensities to a positional mapping, and then operating upon the signal at each different position to perform the desired computing or processing. The cross-section of a light beam 2 can be envisioned as an aggregation of a large number of pixel locations 4, as illustrated in FIG. 1. Because the pattern of light intensity at each different pixel location can be imaged or mapped elsewhere in the system, this pattern may be employed as an information coding system. For various computing and logic processing purposes it is desirable to group the various pixels by their respective optical intensity levels, rather than by their spatial positions within the beam. In other words, it is desirable to be able to convert the spatial intensity pattern of beam 2 to a positional mapping 6, in which all pixels having a common optical intensity are mapped to a common position on a distance spectrum. In the example of FIG. 1 it is assumed, for a simple special case, that the optical intensity levels are grouped into a limited number of discrete levels, rather than extending over a continuum of intensities. Thus, the mapping process may yield a number of discrete spikes 8 which are separated by positional distance, the height of each spike varying with the number of pixels having an optical intensity corresponding to the position of the spike. This representation is called a histogram. Where separate input light beams are presented, such as in discrete optical fibers, it may likewise be desirable to switch the separate beams among various output locations in accordance with their intensities.

A system which accomplishes the desired intensity-to-position mapping is described in U.S. Pat. No. 4,351,589 to Pierre H. Chavel et al., assigned to Hughes Aircraft Company, the assignee of the present invention. The patent discloses the use of liquid crystals to produce variable gratings, which diffract incoming light by varying amounts depending upon the grating period. The optical intensities at the different locations in an input light beam control the grating period at corresponding locations in the liquid crystal media. The variable gratings were employed to convert the spatial intensity distribution within the input beam to a positional mapping of intensities, from which the desired computing and logic functions could be accomplished. Applications of this variable grating mode (VGM) device are disclosed in an article by B. H. Soffer et al., "Optical Computing With Variable Grating Mode Liquid Crystal Devices", 1980 International Optical Computing Conference, SPIE Vol. 232, pages 128–136.

While it facilitates optical data and image processing and optical logic and computing, the variable grating device disclosed in the patent in its present state of development has somewhat slow response times, and works only at low temporal frequencies.

A paper has been published disclosing a single prismatic wedge of liquid crystal, across which a variable voltage is applied to deflect a light beam, M. A. Muriel and J. A. Martin-Pereda, "Digital Light Beam Deflector with Liquid Crystals", 1980 European Conference on Optical Systems and Applications (Utrecht), SPIE Vol. 236, pages 386–388. The amount of deflection which a light ray undergoes after crossing the wedge is said to depend upon the applied voltage. However, the light was subject to a large amount of scattering in transit through the wedge, and the single cell disclosed was not suitable for use in intensity-to-positional mapping. The response time is also slow.

A related technological issue involved an attempt to control the focal length of a lens by means by an applied voltage. This was described in an article by Susumu Sato, "Liquid-Crystal Lens-Cells with Variable Focal Length", Japanese Journal of Applied Physics, Vol. 18, No. 9, September 1979, pages 1679–1684. In this approach liquid crystal cells shaped like a plano-convex lens or a plano-concave lens were prepared. Electric or magnetic fields were applied across the lens-cell to vary its focal length. The authors encountered excessive light scattering and slow response time due to the thickness of the liquid crystal cell.

SUMMARY OF THE INVENTION

In view of the above problems associated with the prior art, the object of the present invention is to provide a system and method capable of mapping the spatial optical intensities within a single light beam or a series of light beams onto a positional array, or for switching among light beams, with a faster response time than available in the prior art, without excessive light scattering, and with an improved temporal frequency response.

These objects are accomplished in a preferred embodiment of the present invention by providing an array of voltage gradient modules, with each module comprising a layer of electro-optic material such as liquid crystals and a means for establishing a variable spatial voltage gradient and electric field across the material in a direction transverse to the input light. The voltage gradients and fields of respective modules are varied in accordance with the optical intensities at corresponding locations in the input light. The modules operate primarily by a diffractive process to produce optical outputs which vary in direction in accordance with the modules' voltage gradient and field variations, thereby mapping the modules' input optical intensities onto the directions of their optical outputs. A lens in the output path focuses the directionally mapped module outputs to a positional mapping of the input light intensities in the focal plane of the lens. The processed input light intensity distribution is reconstructed in the image plane of the lens.

The voltage gradients and fields are created by the interaction between an array of interdigitated electrodes on one side of the electro-optic layer, and a counter electrode on the other side of the layer which may be either a planar electrode or a second array of interdigitated electrodes. Voltages are applied to the electrodes on either side of the electro-optic layer to establish the desired spatial voltage gradients through the layer.

The invention may be implemented in a variety of specific applications. These include a reflective liquid crystal light valve, a transmissive liquid crystal light valve, and an optical switch adapted to switch a matrix of input light beams among a plurality of output locations. The invention is capable of accomplishing all of the non-linear optical functions described in Pat. No. 4,351,589, mentioned above, but with a higher speed and better resolution. The invention is particularly suited for optical information processing applications.

In another embodiment of the present invention, an array of small, variable refraction modules are provided to receive an input light beam whose optical intensity varies as a function of position within the beam. Means are provided to vary the refractive indices in each of the individual modules in accordance with the optical intensities at corresponding locations in the beam, and optical outputs are produced from each module in directions which vary in accordance with the modules' refractive indices. The input optical intensities are thereby mapped onto the directions of the optical outputs from the modules. The modules themselves may comprise a number of different pixels, with a directional output from each pixel. With the addition of a focusing means in the path of the module optical outputs, the directionally-mapped outputs are focused to a positional mapping of the input beam intensities.

In a preferred embodiment the modules are formed from an electro-optic material, preferably liquid crystals, and their refractive indices are varied by applying a variable electric field across the modules. The modules are a set of similar, replicated wedge-shaped prisms, with one face lying in a common plane with the other modules and an opposed face supporting a transparent electrode. Means are provided to apply a voltage across the opposed faces of each module which varies in accordance with the optical intensity at the corresponding location in the input beam.

Specific applications of the invention to transmissive and reflective mapping devices are disclosed, in both of which a photoconductive layer is placed under the common prism plane. The prisms and underlying photoconductor form voltage dividers, with the voltage level across each prism varying in accordance with the intensity of the input light beam at the immediately underlying portion of the photoconductor. In the transmissive device the input beam is transmitted through the photoconductor and prisms and is directly converted to a positional mapping. In the reflective device, the input beam is kept from the prisms by a light blocking medium between the photoconductor and prisms. A readout beam is directed onto the opposite side of the prisms from the input beam, and reflected back through the prisms by a mirror. The readout beam thus experiences a two-fold refraction, and produces a positional mapping with a greater spread.

The use of a large number of separate prisms in the array makes it possible to preserve a small thickness for each individual prism. With a thickness of less than about 100 microns, light scattering problems are overcome, and furthermore a rapid response is also achieved.

These and other features and advantages of the invention will be apparent to those skilled in the art from the following detailed description of preferred embodiments, taken together with the accompanying drawings, in which:

DESCRIPTION OF THE DRAWINGS

FIG. 4a is a simplified sectional view illustrating one electrode arrangement for establishing the voltage gradients;

FIG. 4b is a graph indicating the voltage gradients and fields established by the embodiment of FIG. 4a;

FIG. 5 is a simplified sectional view of another electrode arrangement;

FIG. 6 is a sectional view of an embodiment in which input light is transmitted through a liquid crystal light valve to achieve positional mapping;

FIG. 7 is a sectional view of another embodiment in which a reflective liquid crystal light valve utilizes separate input and readout beams to achieve positional mapping;

DETAILED DESCRIPTION OF PREFERRED EMBODIMENTS

Figure 1:
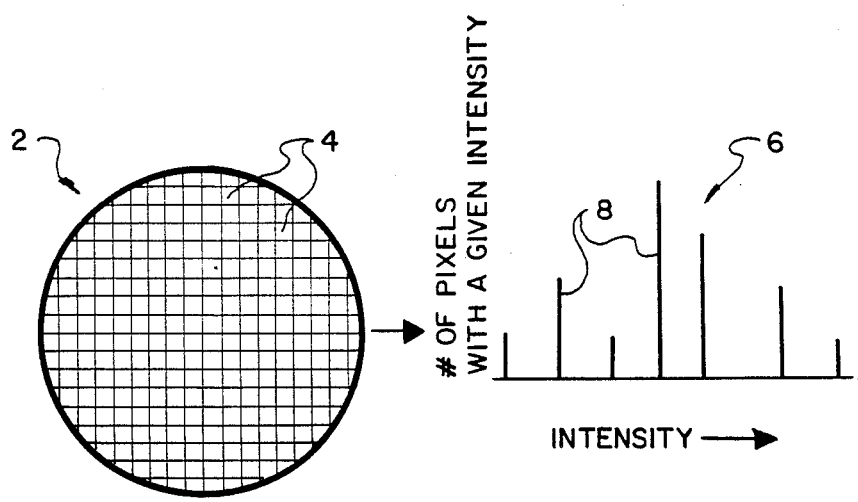
FIG. 1 is an illustrative diagram of the intensity-to-position mapping, described above, achieved by the invention.
Figure 2:
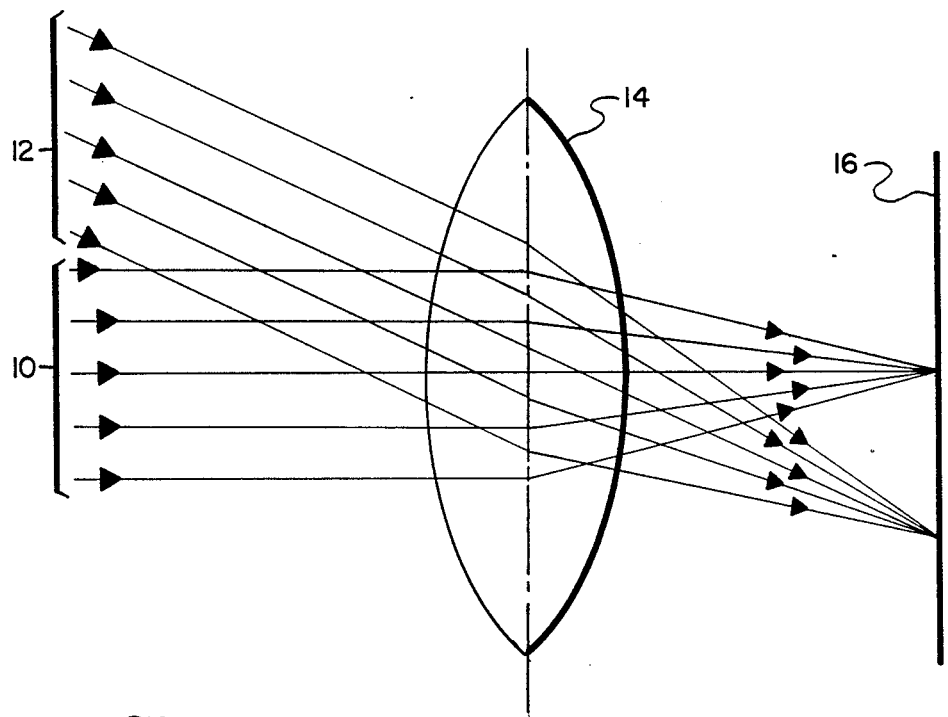
FIG. 2 is a side elevation view of a lens and ray diagram illustrating one of the principles of the invention, that angles and positions can be mapped to each other.

The present invention makes use of a novel light deflection mechanism to achieve a positional mapping of a spatial optical intensity profile with subsequent reconstruction of the profile, with an intermediate directional mapping. To illustrate the transformation of the intermediate directional mapping to the final positional mapping, two light beams 10 and 12 are shown directed upon a lens 14 in FIG. 2. Each beam is collimated and occupies a substantial cross-sectional area, as indicated by the multiple ray lines for each beam. So long as the rays of each beam are parallel, they are focused by lens 14 essentially to points on the lens focal plane 16. The focal position of each beam on the focal plane will depend upon its direction relative to the optical axis of the lens. Beam 10, which is parallel to the lens axis, will be focused to a point along that axis. This will apply to all of the rays in beam 10, including those which are far removed from the lens axis. Since all of the rays in beam 12 are parallel, they will likewise be focused to a single point on the lens focal plane, even though the rays themselves may be distributed over a substantial portion of the lens. The distance of the beam's focus point from the lens axis will vary with the angle between the beam and axis.

One embodiment of the present invention utilizes the phenomena just described to achieve a mapping of spatial beam intensities to position in a two-step process. First, the beam is processed so that a series of small output beams are produced, with the position of each output beam corresponding to a particular location in the input beam, and the directions of the output beams corresponding to the optical intensities at their respective locations in the input beam. All of the output beams for common-intensity locations of the input beam are thus parallel, and the difference in direction among different output beams will increase as the difference between the corresponding input beam intensities increase. In the second step, each set of parallel output beams is focused to respective common points in the lens focal plane, thereby producing a positional distribution corresponding to the optical intensities of the input beam.

Figure 3:
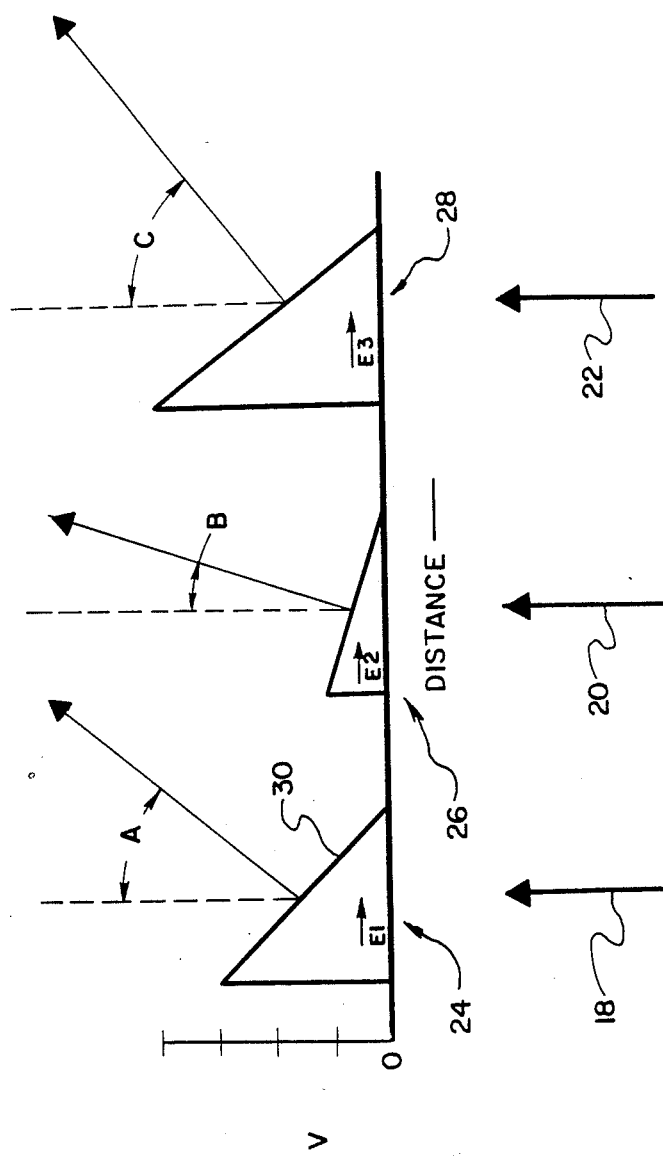
FIG. 3 is a side elevation view illustrating the voltage gradient modules employed in the invention.

The mechanism used to control the deflections of the output beam may be conceptualized as a pattern of separate voltage gradient "modules". A series of such modules which may be used for positional mapping is shown in FIG. 3, which plots voltage against distance. Each module has an associated spatial voltage gradient transverse to the beam and an associated phase gradient, which deflects its corresponding portion of the beam by an amount which varies with the gradient magnitude. The physical apparatus used to establish the gradients is described in a later section.

Three beam pixels 18, 20 and 22 are illustrated as being directed towards modules 24, 26 and 28, respectively. Module 24 has an intermediate voltage gradient, indicated by line 30 which slopes down from an intermediate voltage level along a unit distance transverse to the input beam pixel 18. The voltage gradient produces an electric field which has a component E1 that is also transverse to pixel 18, and has an intermediate magnitude. When the voltage gradient is established through an electro-optic material, a phase gradient is established which will deflect the input light pixel 18 by an angle A which varies in positive proportion to the gradient magnitude. When an array of small modules are employed, they will operate in a manner analogous to a blazed grating, deflecting the incoming light into a Fourier array of discrete deflection angles, with the intensity of the deflected light peaking at angle A and generally progressively diminishing therefrom.

Module 26 illustrates a lower voltage gradient, with a proportionately lower electric field E2 transverse to the input pixel 20. This will produce a smaller deflection angle B. Module 28, on the other hand, has a larger voltage gradient transverse to its input pixel 22. This produces a larger electric field E3 transverse to the input light, and a correspondingly larger deflection angle C.

A physical set-up for establishing the spatial voltage gradients is illustrated in FIG. 4a. An array of interdigitated electrodes 30 are positioned across the gradient area from a counter electrode 32, which in this embodiment is a planar electrode. The interdigitated electrodes 30 are flat and preferably elongated into the page. Alternate electrodes 34 are connected to one side of a voltage source 36, while the intervening electrodes 38 are connected in common with the counter electrode 32 to the opposite side of the voltage source, which may be at ground potential. Each of the interdigitated electrodes is laterally spaced from its adjacent electrodes. A resistor sheet 40 may be provided in contact with each of the interdigitated electrodes to linearize the voltage gradients therebetween.

The voltage gradients produced by the electrode array is illustrated in FIG. 4b, which is vertically aligned with FIG. 4a. The solid lines 42 sloping down and to the right indicate voltage gradients having an associated electric field component E directed to the right; the solid lines 44 sloping down and to the left indicate voltage gradients having an associated electric field component E directed towards the left. The solid voltage gradient lines result from the use of resistive sheet 40; voltage gradients indicated by dashed curved lines result when no resistive sheet is used.

An alternate embodiment in which interdigitated electrodes 46 and 48 are employed on both sides of the voltage gradient area is illustrated in FIG. 5. In this embodiment alternate electrodes in the upper array 46 are connected to two different voltage potentials, respectively, and similar connections are made for the alternate electrodes in the lower array 48. The directions of the transverse electric field components between the two electrode arrays are indicated by arrows.

The application of the invention to a transmissive liquid crystal light valve (LCLV) is shown in FIG. 6. An interdigitated electrode array 50 is formed on a transparent glass plate (not shown) on one side of a layer of nematic liquid crystals 52, while a planar electrode 54 is formed on another glass plate (not shown) on the other side of the liquid crystal layer. A layer of photoconductive material 56 is disposed between planar electrode 54 and liquid crystal layer 52. The two sets of electrodes form a plurality of small, replicated voltage gradient modules for deflecting incoming light. A voltage differential is established between the interdigitated electrodes 50 and planar electrode 54, such as by applying a voltage V to every other one of the interdigitated electrodes 50, and grounding the intervening interdigitated electrodes and the planar counter electrode 54. With a liquid crystal medium between the electrodes, the voltage between the two electrodes would preferably be AC driven at about 10 kHz. Since the photoconductive layer 56 has a very high impedance in the absence of applied light, most of the voltage between the electrodes will normally be established across the photoconductor 56. In this embodiment both electrodes should be transparent.

An input light beam 57 is shown directed onto the underside of the planar electrode 54 and photoconductive layer 56. As used herein, the term "light" is intended in a broad sense to include any electromagnetic radiation capable of being refracted or diffracted by the electro-optic modules described herein, rather than just the visible portion of the spectrum. Although in practice it might be continuous, beam 57 is illustrated for simplicity as constituting four separate rays. One ray has a relatively low optical intensity designated two rays have an intermediate optical intensity designated 2, and the last ray has a relatively high optical intensity designated 3.

As is well known, a photoconductor will become partially conductive in the presence of light, with the degree of conductance varying with the intensity of the imposed light. Also, most photoconductors are not subject to significant light spreading, and can be designed with a high transverse electrical impedance. Accordingly, the conductivity of the photoconductive layer in the path of each light ray will vary in a positive fashion with the intensity of that light ray. Specifically, the conductivity of the photoconductive layer in the vicinity of the low intensity ray will be relatively low, its conductivity in the vicinity of the two intermediate intensity rays will be of an intermediate level, and the photoconductor conductivity in the vicinity of the high intensity ray will be relatively high. A voltage divider is established between each module of the liquid crystal and the underlying portion of the photoconductive layer, and the portion of the voltage dividers attributable to the liquid crystals will vary in accordance with the conductivity of the underlying photoconductor material. Thus, the module in line with the highest intensity ray will support the greatest voltage differential through the liquid crystal layer (and therefore the greatest electric field), while the module in line with the lowest intensity ray will support the lowest voltage differential.

A pattern of voltage gradients transverse to the input light rays will thus be established through the liquid crystal layer in a fashion similar to FIG. 4b, but the magnitude of each voltage gradient will vary in accordance with the voltage divider effect between the liquid crystal and underlying photoconductive layer at that location. Thus, as the input light rays are transmitted through the photoconductive layer and their respective modules in the liquid crystal, the highest intensity ray will undergo the greatest deflection as it exits the light valve, while the lowest intensity ray will experience the lowest deflection as it exits its respective portion of the light valve. The two rays of equal intermediate intensity will each be deflected by the same intermediate angle, and will thus exit their respect modules as parallel rays. This controlled deflection implements the first step of the mapping process described previously, that of mapping the spatial distribution of light intensities onto the direction of output rays.

A lens 58 is positioned over the light valve so as to focus light emerging therefrom onto its back focal plane 60, which is centered on the lens axis 62. Because it was deflected the least upon exiting the light valve, the light ray corresponding to the lowest optical intensity will be focused onto the focal plane at point 64, nearest to the lens axis (for a practical device it will actually be focused as a series of points corresponding to a Fourier spectrum, as described further below, but the peak will be located at point 64). The ray corresponding to the highest input intensity experiences the greatest deflection, and accordingly is focused in a similar manner onto point 66 of the focal plane at a much greater distance from the lens axis. The two rays of intermediate intensity exit the light valve as parallel rays, and accordingly are focused to a common intermediate point 68 on the focal plane between points 64 and 66. Thus, the optical intensities at separate pixel locations in the original input beam are mapped onto a positional array in which increasing distance from the lens axis corresponds to pixels of increasing optical intensity, regardless of the positions of the pixels in the input beam. The original input light intensity distribution is reconstructed as a phase image in the back image plane of lens 58.

While a liquid crystal layer 52 is used in the preferred embodiment, in principle any electro-optic material could be used. An electro-optic material is defined as one whose refractive index varies with the magnitude of an applied electric field. Nematic liquid crystal presently in common use is preferred because, although its response is somewhat slower than many other materials, it exhibits the largest change in refractive index for relatively small changes in electric field. In the future "quantum well" or ferroelectric liquid crystal devices may offer the potential for faster response than is presently available with conventional nematic liquid crystals.

A reflective light valve is illustrated in FIG. 7 which is somewhat analogous to a conventional reflective liquid crystal light valve, such as that shown in U.S. Pat. No. 3,824,002 to Terry D. Beard and assigned to Hughes Aircraft Company, the assignee of the present invention. Elements of this device which are common with the transmissive device of FIG. 6 are indicated by the same reference numerals. Specifically, the upper interdigitated electrode array 50, the lower planar electrode 54, the layer of nematic liquid crystal material 52 and photoconductive layer 56 are common to both devices. In addition, a light blocking layer 70 is interposed immediately above the photoconductive layer 56, and a reflecting means 72 such as a dielectric or metal matrix mirror is provided between the light blocking layer and the liquid crystal layer 52. An input light beam is applied to the underside of the structure, as in the transmissive embodiment. While the input light again provides a variable voltage divider effect with respect to the photoconductive and liquid crystal layers, the input light is blocked by layer 70 from reaching the liquid crystal. Instead, a readout light beam 74 is directed from above the structure through the transparent interdigitated electrodes 50 and liquid crystal to the underlying mirror 72, and are reflected back through the liquid crystal to emerge as output rays. The readout rays undergo two deflections, once upon entering and again upon exiting the liquid crystal layer.

The voltage gradients and electric fields transverse to the readout rays are controlled by the intensity of the input beam on the photoconductive layer immediately underlying each readout ray. Accordingly, the deflection experienced by each readout ray will vary in accordance with the immediately underlying input beam intensity, as in the transmissive embodiment. However, since each ray of the readout beam undergoes two deflections, the angular spread between the output rays will be greater than in the transmissive embodiment, resulting in a more easily resolved pattern at the focal plane of the lens (not shown) in FIG. 7. In both FIGS. 6 and 7 only the output rays which are deflected to the right are illustrated. Voltage gradients and electric fields oriented to produce deflections in the opposite direction will also be established in the liquid crystal between each of the illustrated rays. These voltage gradients will produce a positional mapping to the left of lens axis 62.

The maximum deflection, $\Theta_{max}$, from one transit of the liquid crystal is given in radians by the expression:

$$\Theta_{max} = \Delta n \, d/a$$

where $\Delta n$ is equal to the difference in refractive index between the extraordinary and ordinary directions (the birefringence) of the liquid crystal, "d" is the thickness of the liquid crystal cell, "a" is the electrode gap width. A typical value for $\Delta n$ is 0.22. The resolution and deflection angle produced by the device will increase with the thickness of the liquid crystal layer, but on the other hand a thicker liquid crystal will significantly slow down the device's response time. A suitable compromise for many applications will be a liquid crystal thickness in the order of 5–15 microns.

Figure 8:
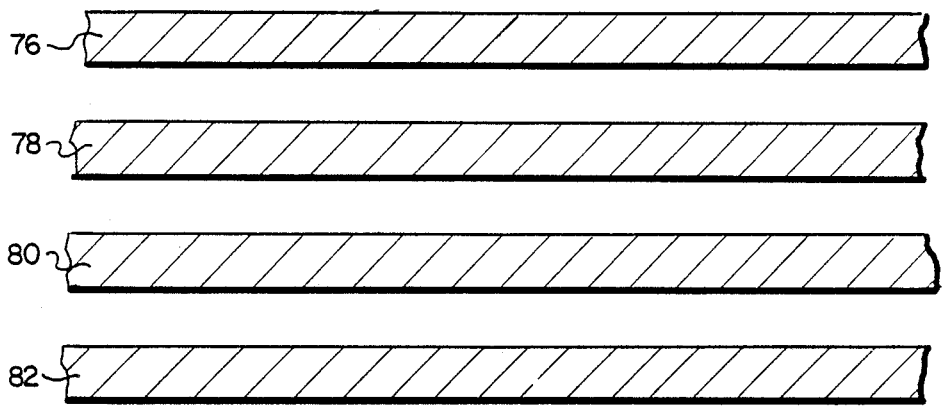
FIG. 8 is a fragmentary plan view of an electrode section.

FIG. 8 illustrates a plan view of a portion of the interdigitated electrode array, consisting of elongated electrodes 76, 78, 80 and 82. The electrodes are each long enough to encompass a plurality of pixels. For good quality images it is desirable to have a large number of electrodes. For a typical light valve resolution of 20 microns, the electrode pairs will also have a periodicity of 20 microns. Thus, the width of each electrode as well as the gap between adjacent electrodes will typically be on the order of 5 microns.

In practice, with a large number of relatively narrow electrodes, the present invention will produce deflections primarily through a diffractive process analogous to a blazed grating. Blazed gratings are physically structured with tilted surfaces, that is, gradients, and are therefore not adjustable, whereas the gradients of the present invention are voltage gradients.

Figure 9:
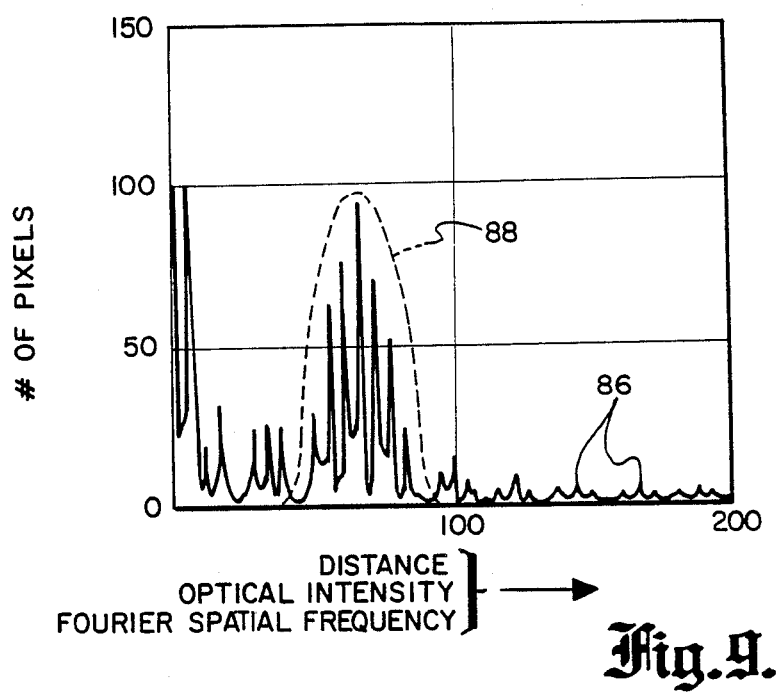
FIGS. 9 and 10 are graphs of typical output light distributions for two different input levels.
Figure 10:
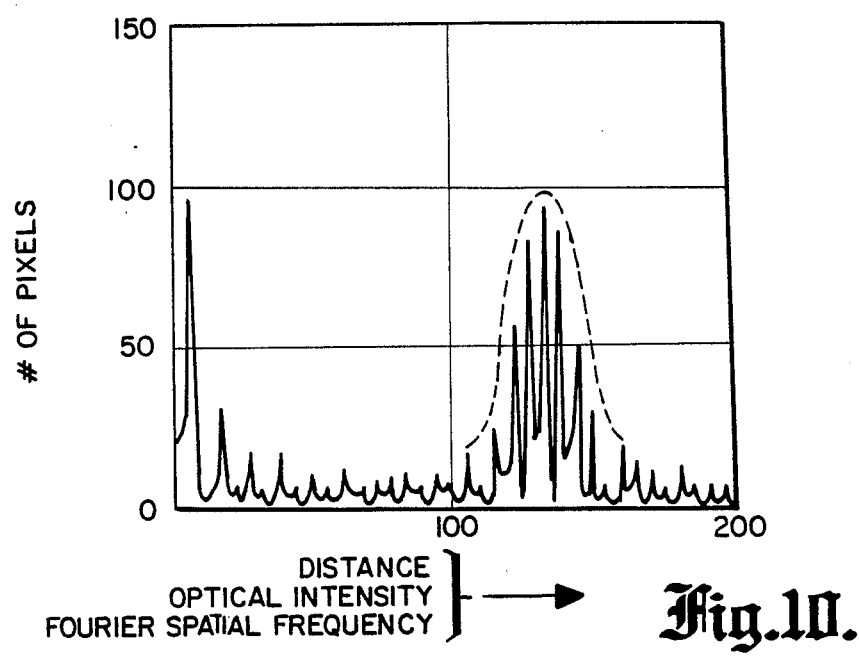

The pattern produced at the focal plane by a light valve such as that shown in FIGS. 6 or 7 is illustrated in FIGS. 9 and 10, with FIG. 9 showing a smaller deflection corresponding to a lower input light intensity. The two graphs have normalized horizontal and vertical scales. The horizontal scale corresponds to distance along the focal plane, and also to the input optical intensity and to the Fourier spatial frequency. The vertical scale indicates the number of pixels mapping onto a particular portion of the horizontal scale. All along the horizontal scale a series of minor diffraction orders 86 will be produced, due to the periodicity of the electrodes and voltage gradient modules. These discrete orders correspond to the Fourier components of the electrodes. At a location corresponding to the intensity of the input pixel, a series of elevated spikes will be mapped to form a distinct envelope 88. The width of the envelope, or in other words the number of spikes included within the envelope, varies inversely with the width of the modules formed by each electrode pair (pixel width). As the pixel's optical intensity increases or decreases, the location of the various diffractive orders will remain fixed in Fourier space, but their heights will change so that the envelope 88 moves a corresponding distance to the right or left, respectively. FIG. 10 illustrates the mapping for a pixel intensity twice that of FIG. 9. The number of resolvable deflection angles is given by the product of the maximum deflection given above and the pixel width, and is approximately 18 for the above parameter values.

Once the intensity-to-position mapping of the input beam has been achieved, any desired portion of the mapped image can be fully or partially blocked or modified. One or more intensities of interest can be simply blocked or modified by operating upon its position in the focal plane. Thus, the present invention is adaptable to all of the optical computing and logic processing that can be achieved with the aforementioned U.S. Pat. No. 4,351,589, the contents of which are incorporated herein by reference. In addition, the present invention is capable of operating significantly faster than the referenced patent, and therefore over a greater temporal frequency range. The response time can be lowered to less than 10 msec., with a high output uniformity and resolution exceeding 25 line pairs per mm.

Figure 11:
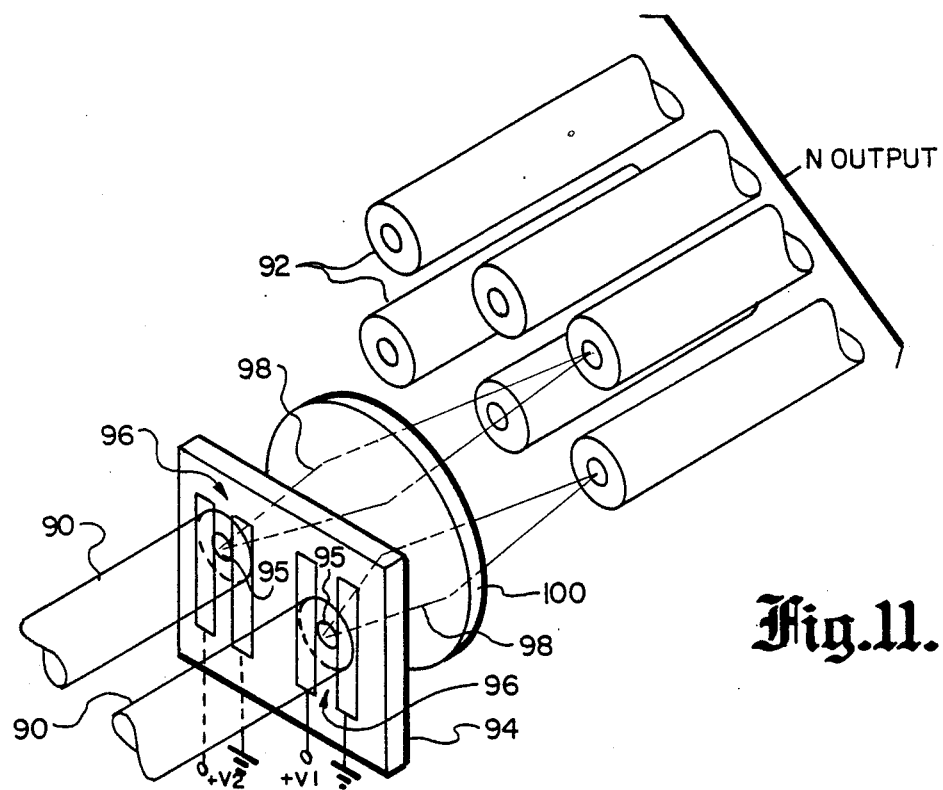
FIG. 11 is a perspective view of an optical switch constructed in accordance with the present invention.

The application of the invention to a fiber optic switch is illustrated in FIG. 11. The light from individual input fibers 90 can be coupled into any one of a plurality of output fibers 92. The switching mechanism consists of a layer of electro-optic material 94, preferably liquid crystals, with each input fiber directed at a target area 95 on the liquid crystal cell. Pairs of electrodes (or a plurality of electrodes) 96 are positioned along one face of the liquid crystal cell on opposite sides of each target area 95. Voltage differentials are applied across each electrode pair, establishing electric fields in the liquid crystal transverse to the direction of light emitted from the input fibers. This produces a deflection of the input light which is a function of the electric field for each fiber. The resulting deflected output light beams 98 are focused by a lens 100 onto corresponding output fibers 92. The electric field produced by each electrode pair can be controlled from an external source, and the beams from each input fiber can be switched independently of the other input beams. Many such input fibers could be coupled via the optical deflector to a large number of output fibers. A particular input fiber could also be coupled to multiple output fibers simultaneously by spreading the light from the input fiber transverse to the electrodes before it is input to the liquid crystal deflector.

In another embodiment, using refraction principles, an array of small, variable refraction modules may be provided to receive an input light beam whose optical intensity varies as a function of position within the beam.

Figure 12:
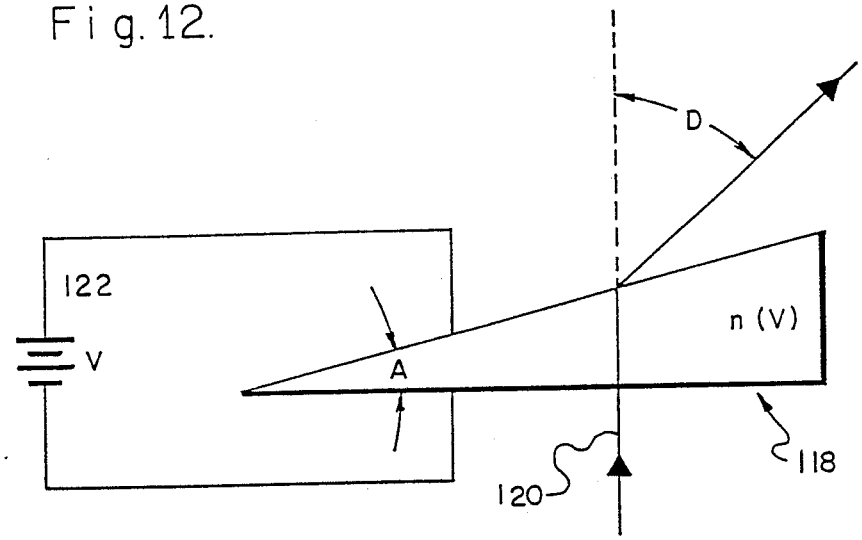
FIG. 12 is a side elevation view of a wedge-shaped prism illustrating its refractive response to an applied electric field.

A basic refractive module employed to accomplish this mapping is illustrated in FIG. 12. A large number of such modules are placed over the area of the input beam, each module being relatively small in size and producing an individual output or a set of outputs. In its simplest form, the module consists of a wedge-shaped prism 118 formed from an electro-optic material and having an index of refraction n in the absence of an electric field. An electro-optic material is defined as a material whose refractive index varies with the intensity of an applied electric field. In principle, any electro-optic material could be used, but nematic liquid crystal presently in common use is preferred because, although its response is somewhat slower than many other materials, it exhibits the largest change in refractive index for relatively small changes in electric field. In the future "quantum well" or ferroelectric liquid crystal devices may offer the potential for faster response than is presently available with conventional nematic liquid crystals. Also, while a module in the form of a simple wedge is illustrated, any shape could be used so long as it provided opposed surface planes at two different angles, whereby light is refracted as it passes through the module. A simple wedge-shape is preferred because it occupies a small volume for opposed surfaces having given areas and angular difference. However, it is intended that the terms "wedge" and "prism" as used herein be understood in a broader sense, as referring to any geometric shape having opposed surfaces which lie along planes that, if extended, would intersect each other.

For a module with a refractive index n greater than 1.0, a ray of light 120 which is directed into the module perpendicular to the module's incident surface will be deflected by an angle D by refraction as it emerges from the opposite face of the module. Non-perpendicular incident light will, of course, also be refracted, but a perpendicular ray is illustrated for simplicity. For a small angle prism having an angle A between its opposed surfaces, the deflection angle D will be approximately equal to An. If n is then changed by applying a DC voltage from source 122 across the opposed faces of the module, the deflection angle D will change by an amount which is approximately equal to A times the change in n. The effect of a change in electric field is particularly large for a liquid crystal module; the change in n can be as much as 0.2 for relatively small voltages in the order of 10 volts. The prism angle and the electro-optic induced change in birefringence of the prism material will also affect n.

In accordance with the invention, a large number of relatively small prism modules are employed to transform a beam into a large number of subsidiary beams, each of which has an angular orientation which corresponds to the optical intensity at a particular location in an input beam. By keeping the thicknesses of the prisms in the direction of the input beam less than about 100 microns, light scattering within the modules can be reduced to acceptable levels for liquid crystal modules (other materials may not scatter much for even greater thicknesses). Furthermore, when liquid crystals are used, the response time of the device is greatly enhanced by employing relatively thin modules.

Figure 13:
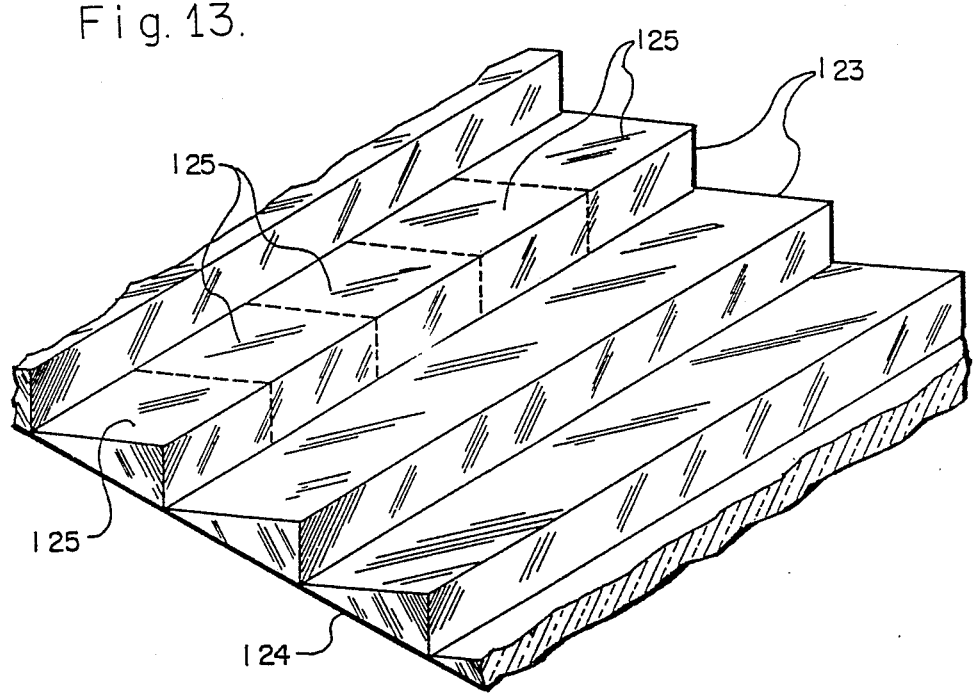
FIG. 13 is a perspective view of a prism array showing separate pixel locations within each prism.

Although theoretically a separate prism could be provided for each light pixel, a more practical form of the module array is shown in FIG. 13. A set of substantially similar replicated elongated prisms 123 are arranged in an array, with one face of each prism in a common base plane 124. Each prism is much longer than it is wide, with its height again preferably limited to less than 100 microns. Since different portions of a single prism may have different refractive indices if they are subjected to different electric fields, each prism is effectively divided into a series of pixel locations 125 distributed along its length. Each pixel location will refract a light ray in accordance with the local electric field at that location. Each prism will thus emit a set of light rays at various angles, depending upon the electric fields at its respective pixel locations.

Figure 14:
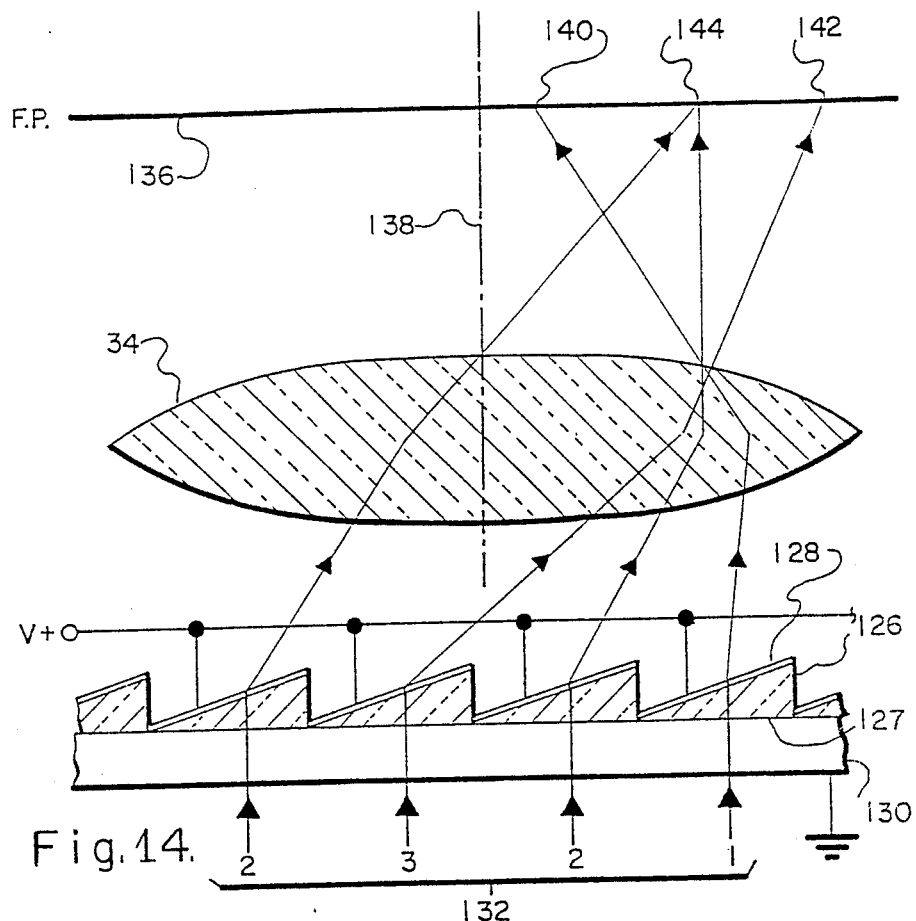
FIG. 14 is a sectional view of one embodiment of the invention, in which input light is transmitted through a prism array to achieve positional mapping.

A transmissive device which employs the invention is shown in FIG. 14. A plurality of small, replicated, substantially congruent prisms 126 such as those illustrated in FIG. 13 are arranged With a similar face of each prism lying in a common plane 127. Electrodes 128 are deposited on the opposed surfaces of the prisms, while a layer of photoconductive material 130 underlies the prisms. A voltage differential is established between the electrodes 128 and the opposite side of photoconductive layer 130, such as by applying a voltage V+ to the electrodes and grounding the underside of the photoconductive layer. When liquid crystals are used, the preferred voltage would be AC driven at about 10 kHz. The prisms and photoconductor in essence form a voltage divider for the applied voltage differential. Since the photoconductive layer has a very high impedance in the absence of applied light, most of the voltage will normally be established across the photoconductor.

An input light beam 132 is shown directed onto the underside of the photoconductive layer 130. Although in practice it might be continuous, the beam 132 is illustrated for simplicity as constituting four separate rays. One ray has a relatively low optical intensity designated 1, two rays have an intermediate optical intensity designated 2, and the last ray has a relatively high optical intensity designated 3. Accordingly, the conductivity of the photoconductive layer immediately below each prism 126 will vary in a positive fashion with the intensity of the input light ray which is aligned with that prism. This alters the voltage dividers established between the photoconductor and each of the modules, shifting voltage potentials from the photoconductor onto the modules in amounts which vary with the conductivity of the photoconductor underlying each module in each pixel. Thus, the module (or pixel) in line with the high intensity ray will support the greatest voltage potential (and therefore the greatest electric field), while the module (or pixel) in line with the lowest intensity ray will support the lowest voltage differential.

The refractive index of each pixel in each module can vary in a positive fashion with the electric field across that module. Thus, as the input light rays are transmitted through the photoconductive layer and their respective modules, the highest intensity ray will undergo the greatest refractive deflection as it exits its pixel in its module, while the lowest intensity ray will experience the lowest refractive deflection as it exits its respective pixel or module. The two rays of equal intermediate intensity will each be refractively deflected by the same angle, and will thus exit their respective pixels in their modules as parallel rays. This controlled deflection implements the first step of the mapping process described previously, that of mapping the spatial distribution of light intensities onto the direction of output rays from the prism array.

A lens 134 is positioned over the prism array so as to focus light emerging therefrom onto its back focal plane 136, which is centered on the lens axis 138. Because it was deflected the least upon exiting the prism array, the light ray corresponding to the lowest optical intensity will be focused onto the focal plane at point 140, nearest to the lens axis. The ray corresponding to the highest input intensity experiences the greatest refractive deflection, and accordingly is focused onto point 142 of the focal plane at a much greater distance from the lens axis. The two rays of intermediate intensity exited the prism array as parallel rays, and accordingly are focused to a common intermediate point 144 on the focal plane between points 140 and 142. Thus, the optical intensities at separate pixel locations in the original input beam are mapped onto a positional array in which increasing distance from the lens axis corresponds to pixels of increasing intensity, regardless of the positions of the pixels in the input beam.

Figure 15A:
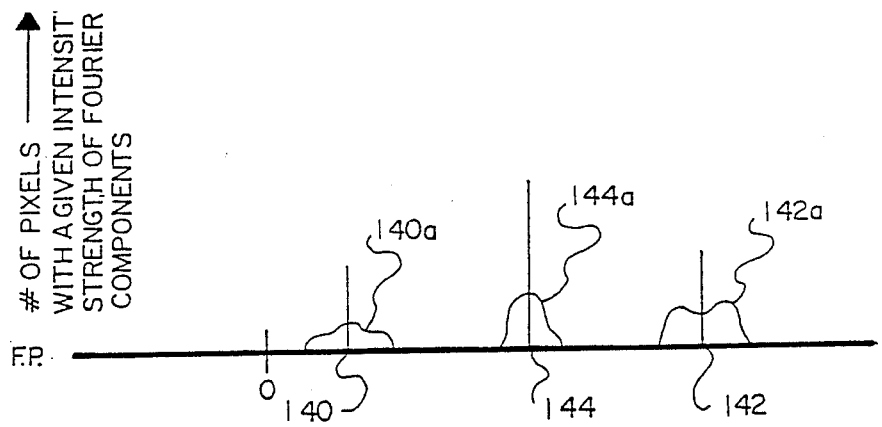
FIGS. 15a and 15b are graphs illustrating the positional mapping achieved with the present invention, including spatial Fourier Transform components.
Figure 15B:
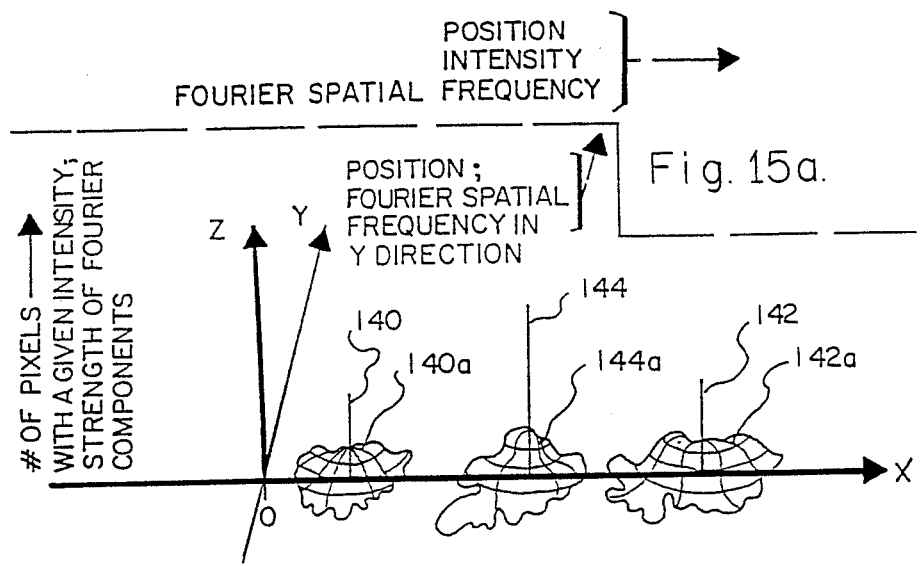

FIGs. 15a and 15b illustrate in greater detail the mapping achieved at the focal plane 136, with the zero-origin corresponding to the zero intensity input deflection position of FIG. 14. FIG. 15a is a two-dimensional representation, while FIG. 15b illustrates the three-dimensional situation. Referring first to FIG. 15a, the intensity of the light rays focused onto any particular point of the focal plane 136 corresponds to the number of pixels having the same corresponding light intensity in the input beam. Thus, the light intensity at point 144 on the focal plane is twice that at either points 140 or 142, since two input pixels or light rays had an optical intensity corresponding to intermediate position 144, while only one pixel or ray in the input beam had an optical intensity corresponding to the positions for each of points 140 and 142.

For ordinary input images, each location in the input beam will have a range of associated frequencies which will also map onto the lens focal plane via the Fourier Transform (FT). These mappings are indicated by spectrums 140a, 142a and 144a. While represented as discrete mappings, the FT associated with each particular intensity will in practice tend to merge with the FT for adjacent intensities. The presence of FT components are beneficial, in that the Fourier sidebands carried along to the back focal plane 136 with each ray refracted from a given pixel location will preserve phase information as well as the intensity information obtained from the positional mapping. The phase information can be used to determine the location of each particular ray in the original image; by performing an inverse FT of the FT spectra at the focal plane, the original image locations can be re-created.

To prevent the FT mapping from interfering with the intensity mapping, the FT spectra are restricted to small angles compared to the refraction angles associated with the intensity information. This can be accomplished with a proper selection of prism dimensions, lens focal length, and system distances. Such techniques are well known.

A three-dimensional representation of the positional mapping is illustrated in FIG. 15b. All of the optical intensity information is distributed along the x-axis, whereas the Fourier spatial frequency components accompany the intensity mappings in both the x and y directions.

Figure 16:
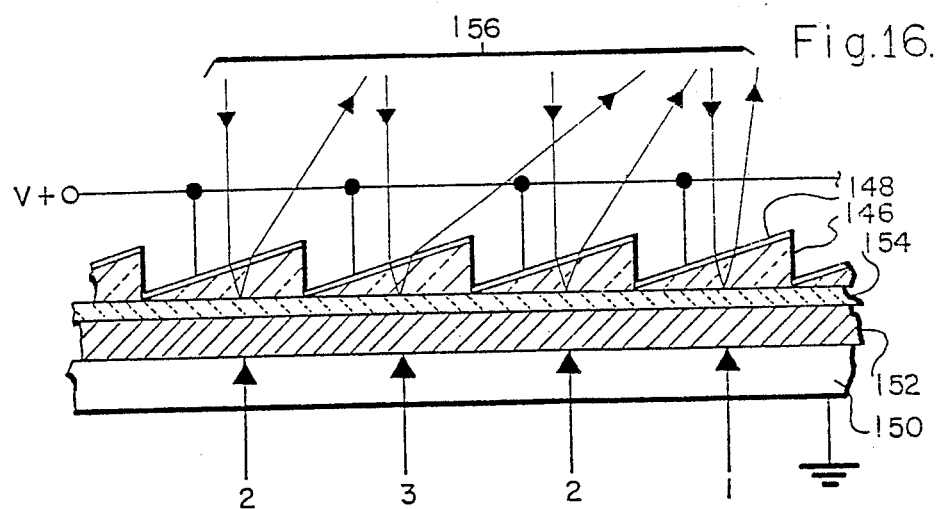
FIG. 16 is a sectional view of a reflective embodiment of the invention which utilizes separate input and readout beams.

A reflective implementation of the invention is illustrated in FIG. 16. This device is somewhat analogous to a reflective liquid crystal light valve, such as that shown in U.S. Pat. No. 3,824,002 to Terry D. Beard and assigned to Hughes Aircraft Company, the assignee of the present invention. An array of electro-optic prisms 146 are provided with transparent electrodes 148 on their upper surfaces, and overlie a photoconductive layer 150 as in the transmissive embodiment of FIG. 14. However, a light blocking layer 152 is interposed immediately above the photoelectric layer 150, and a reflecting means 154 such as a dielectric or metal matrix mirror is provided between the light blocking layer and the common lower plane of the prisms.

An input light beam is applied to the underside of the structure, as in the transmissive embodiment. While the input light again provides a variable voltage divider effect with respect to the photoconductive layer, individual prisms and voltage source V (which can be an AC voltage source as well as a DC source), it is blocked by layer 152 from reaching the prisms. Instead, a readout light beam 156 is directed from above the structure onto the transparent electrodes 148 on the prism surfaces opposite to the mirror. The rays of the readout beam travel through the electrodes and prisms to the underlying mirror, and are reflected back through the prisms and electrodes to emerge as output rays. The readout rays are refracted twice, once upon entering and again upon exiting their respective prisms. The refractive indices of the pixels in the various prisms are controlled by the intensity of the input beam on the photoconductive layer immediately underlying each prism. Accordingly, the refractive deflection experienced by each readout ray will vary in accordance with the immediately underlying input beam intensity, as in the transmissive embodiment. However, since each ray of the readout beam undergoes two refractions, the angular spread between the output rays will be greater than in the transmissive embodiment, resulting in a more easily resolved pattern at the focal plane of the lens (not shown).

While both the transmissive embodiment of FIG. 14 and the reflective embodiment of FIG. 16 have been illustrated with a single input ray directed at each prism, it should be understood that in practice the input beam may be continuous, and each prism may be subjected to a range of input optical intensities along its length. Because of the low degree of spreading of both electrical and optical information in the photoconductive layer and also in the electro-optic prisms themselves, each prism will thus deliver output light over a range of angles. These angles correspond to the optical intensity input range immediately underlying the various pixel locations of the prisms. The continuum of outputs from each prism are focused to a positional mapping on the focal plane, just as with the discrete directional outputs described above.

The prisms themselves may be formed by conventional techniques, such as by etching or the scribing used to make far infrared gratings. Hollow prisms are preferably formed, with their internal surfaces prepared using standard techniques to properly align the liquid crystal fill. Since the provision of an array consisting of a large number of relatively small prisms is somewhat analogous to a Fresnel lens (although the prisms used in a Fresnel lens having varying wedge angles, as opposed to the common wedge angle preferred for the present invention), it may also be possible to employ plastic replica Fresnel lenses coated with transparent conductive electrodes.

The dimensions of the prisms are also important. It is desirable that the wedge angle be small to limit the prism thickness if liquid crystal is used as the electro-optic-refractive medium, to avoid scattering at the thicker end of the prism. Also, a large wedge angle may result in a difference in the response speed from one side of the prism to the other. On the other hand, larger angular deviations per unit voltage are achieved with larger prism angles. A suitable compromise should be reached for each particular application. As mentioned previously, the thickness of the prisms normal to their common plane should be less than about 100 microns, to keep response times and light scattering within acceptable limits. However, care must be taken so that the dimensions of the prisms are not so small as to produce a significant overlap between the diffraction and refraction regions. While some degree of diffraction will normally be present, the diffraction angle depends upon the spacing and size of the prisms compared to the wavelength of the readout light. The prisms should be large enough so that the diffraction and refraction angles are clearly separated.

Once the positional mapping of the input beam intensities has been achieved, any set of optical intensities can be fully or partially blocked or modified. One or more intensities of interest can be simply blocked or modified at its position in the focal plane. Since each output at the focal plane carries along its own complex FT, including phase information, selected portions of the input beam phase as well as intensity can be filtered.

Several embodiments of the invention have thus been shown and described. However, it should be understood that numerous variations and alternate embodiments will occur to those skilled in the art. Accordingly, it is intended that the invention be limited only in terms of the appended claims.

We claim:

1. An optical intensity mapping apparatus comprising:
    an array of modules formed from an electro-optic material comprising liquid crystals, said array of modules comprising an array of voltage gradient modules established in a layer of the electro-optic material,
    means for establishing a variable spatial voltage gradient across the layer of electro-optic material in a gradient direction transverse to the input light so as to establish said array of voltage gradient modules, comprising an array of interdigitated electrodes on one side of the layer of electro-optic material, a counter electrode on the other side of the layer of electro-optic material, and voltage source means for applying voltages to the interdigitated electrodes and the counter electrode to establish spatial voltage gradients therebetween, the counter electrode comprising a substantially continuous electrode opposed to the array of interdigitated electrodes,
    the voltage source means being connected to supply a first voltage to alternate electrodes of the interdigitated electrodes, and a second voltage in common to the intervening interdigitated electrodes and to the counter electrode,
    means for receiving an input light beam whose optical intensity varies as a function of position within the beam,
    means for spatially and temporally varying the voltage gradient of each module of said array of modules in accordance with the optical intensities at corresponding locations in the beam, said means for spatially and temporally varying comprising a layer of voltage modification material between the counter electrode and the electro-optic material, the voltage modification material being adapted to modify the module voltage gradients across the electro-optic layer in accordance with the optical intensities of the received light at locations corresponding to the respective modules,
    means for producing optical outputs from each module in directions which vary in accordance with the variations in the voltage gradient, such that the input optical intensities are mapped onto the directions of the optical outputs from each of the modules, and
    focusing means in the path of the optical outputs adapted to focus the directionally-mapped outputs to a positional mapping of the input beam intensities.

2. An optical intensity mapping apparatus, comprising:
    an array of modules formed from an electro-optic material comprising liquid crystals, said array of modules comprising an array of voltage gradient modules established in a layer of the electro-optic material,
    means for receiving an input light beam whose optical intensity varies as a function of position within the beam,
    means for spatially and temporally varying the voltage gradient of each module of said array of modules in accordance with the optical intensities at corresponding locations in the beam,
    means for establishing a variable spatial voltage gradient across the layer of electro-optic material in a gradient direction transverse to the input light to establish said array of voltage gradient modules, wherein said means for establishing said variable spatial voltage gradient comprises a first array of interdigitated electrodes on one side of the layer of electro-optic material, a counter electrode on the other side of the layer of electro-optic material, and voltage source means for applying voltages to the interdigitated electrodes and the counter electrode to establish spatial voltage gradients therebetween, the counter electrode comprising a second array of interdigitated electrodes opposed to the first array, the electrodes in the first interdigitated array being offset from the electrodes in the second interdigitated array, and the voltage source means applying a first voltage in common to alternating electrodes in both arrays, and a second voltage in common to the intervening electrodes in both arrays,
    means for producing optical outputs from each module in directions which vary in accordance with the variations in the voltage gradient such that the input intensities are mapped onto the directions of the optical outputs from each of the modules, and
    focusing means in the path of the optical outputs adapted to focus the directionally-mapped outputs to a positional mapping of the input beam intensities.

3. An optical intensity mapping apparatus, comprising:
    an array of modules formed from an electro-optic material comprising liquid crystals, said array of modules comprising an array of variable refraction modules,
    the modules comprising elongated prisms arranged in parallel rows with a common base, each prism further comprising a plurality of pixel locations along the direction of elongation;
    means for applying a common voltage to respective faces of each said prism;
    means for receiving an input light beam whose optical intensity varies as a function of position within the beam;
    means for spatially and temporally varying a parameter of each module of said array of modules in accordance with the optical intensities at corresponding locations in the beam, the varying parameter being the refractive index, said means for spatially and temporally varying comprising a photoconductive layer adjacent said common base for applying a spatial voltage pattern to each said prism, the voltage pattern varying in accordance with the optical intensities at the locations in the input beam which correspond to the pixel locations so that the refractive indices of each prism are accordingly varied;
    means for producing optical outputs from each module in directions which vary in accordance with the variations in the parameter, such that the input optical intensities are mapped onto the directions of the optical outputs from each of the modules;

focusing means in the path of the optical outputs adapted to focus the directionally-mapped outputs to a positional mapping of the input beam intensities.

4. A transmissive optical intensity mapping apparatus, comprising:

an array of modules formed from an electro-optic material comprising liquid crystals, wherein said array of modules comprises an array of substantially similar prisms formed from the liquid crystal material, one face of each prism lying in a substantially common plane with the other prisms, electrode means for applying a voltage across said electro-optic material wherein said electrode means includes respective transparent electrodes disposed on the faces of the prisms opposed to the common plane, a layer of photoconductive material adjacent the electro-optic material, said photoconductive layer being adjacent the common plane and adapted to transmit to the electro-optic layer an input light beam whose optical intensity varies as a function of the position within the beam, the photoconductive material forming a voltage divider with the electro-optic material so that the magnitude of any particular voltage gradient impressed on the electro-optic material is a function of the input light intensity at a corresponding location in the photoconductive material, and the apparatus further includes:

means for focusing light exiting the prism array to a positional mapping of the spatial input light intensity.

5. The optical intensity mapping apparatus of claim 4, wherein each prism is elongated and comprises a plurality of pixel locations, each pixel location forms a voltage divider with the underlying portion of the photoconductive layer, the portion of the voltage differential impressed across each pixel location and thereby the prisms' refractive indices at its pixel locations varies with the intensities of the input light beam at the portions of the photoconductive layer underlying the pixel locations, and the input light exits the prism electrodes at angles corresponding to the refractive indices at the pixel locations.

6. The apparatus of claim 5 in a reflective mode by further including a mirror on the photoconductive layer side of the common plane, with a reflective surface facing the liquid crystal side.

7. An optical intensity mapping apparatus, operable in a reflective mode, comprising:

an array of modules formed from an electro-optic material comprising liquid crystals, wherein said array of modules comprises an array of voltage gradient modules in a liquid crystal layer formed from the liquid crystals, electrode means for applying a voltage across said electro-optic material, a layer of photoconductive material adjacent the electro-optic material, the photoconductive layer being adapted to transmit to the electro-optic layer an input light beam whose optical intensity varies as a function of the position within the beam, the photoconductive material forming a voltage divider with the electro-optic material so that the magnitude of any particular voltage gradient impressed on the electro-optic material is a function of the input light intensity at a corresponding location in the photoconductive material, an array of interdigitated electrodes on one side of the liquid crystal layer, a counter electrode on the other side of the liquid crystal layer, and voltage means connected to supply a first voltage to alternate electrodes of the interdigitated electrodes, and a second voltage in common to the intervening interdigitated electrodes and to the counter electrode.

* * * * *

UNITED STATES PATENT AND TRADEMARK OFFICE
CERTIFICATE OF CORRECTION

PATENT NO. : 4,958,914

DATED : September 25, 1990

INVENTOR(S) : Y. OWECHKO ET AL.

It is certified that error appears in the above-identified patent and that said Letters Patent is hereby corrected as shown below:

CLAIM 6, column 18, line 1, after "of Claim 5" insert therefor
--operable--.

Signed and Sealed this

Twentieth Day of October, 1992

Attest:

DOUGLAS B. COMER

Attesting Officer     Acting Commissioner of Patents and Trademarks